(12) United States Patent
Somavar Muniappan et al.

(10) Patent No.: US 12,351,391 B1
(45) Date of Patent: Jul. 8, 2025

(54) SYSTEMS AND METHODS FOR UNLOADING SHUTTLES AND LOADING TOTES USING LINEAR ACTUATORS

(71) Applicant: Amazon Technologies, Inc., Seattle, WA (US)

(72) Inventors: Vinodhkumar Somavar Muniappan, Redmond, WA (US); Sudhakar Teegavarapu, Hopkinton, MA (US); Ganesh Krishnamoorthy, Seattle, WA (US); Zechariah Ives, Auburn, WA (US)

(73) Assignee: Amazon Technologies, Inc., Seattle, WA (US)

( * ) Notice: Subject to any disclaimer, the term of this patent is extended or adjusted under 35 U.S.C. 154(b) by 201 days.

(21) Appl. No.: 18/343,637

(22) Filed: Jun. 28, 2023

(51) Int. Cl.
*B65G 1/04* (2006.01)
*B65G 1/137* (2006.01)

(52) U.S. Cl.
CPC ......... *B65G 1/0435* (2013.01); *B65G 1/1375* (2013.01); *B65G 1/1378* (2013.01)

(58) Field of Classification Search
CPC ............................ B65G 1/1378; B65G 1/0435
USPC ................................ 198/463.1, 463.2, 463.3
See application file for complete search history.

(56) References Cited

U.S. PATENT DOCUMENTS

| | | | | |
|---|---|---|---|---|
| 3,448,870 A * | 6/1969 | Boissevain | .......... | B65G 1/1378 198/465.1 |
| 8,869,973 B2 * | 10/2014 | Marks | ...................... | B05D 5/10 198/618 |
| 2014/0102860 A1 * | 4/2014 | Greyshock | ............. | B65G 47/04 198/618 |
| 2020/0223630 A1 * | 7/2020 | Fosnight | .............. | B65G 1/0464 |

* cited by examiner

*Primary Examiner* — Gene O Crawford
*Assistant Examiner* — Lester Rushin, III
(74) *Attorney, Agent, or Firm* — Eversheds Sutherland (US) LLP

(57) ABSTRACT

Systems and methods are disclosed for a shuttle sortation system having linear actuators for unloading items from shuttles and deposing the items into totes. For example, an item shuttle may transport items in an item holder which may contain an item and that is removable from a base of the item shuttle. The item holder may be constrained from moving with respect to the base and a depositing area may unlock the item holder from the base, permitting the item holder to separate from the base. An upper linear actuator may engage the item holder and may move the item over a tote receiving the area having a tote. The item holder may not have a bottom portion, such that once the item holder is separated from the based, the item is free to fall through to the tote below.

20 Claims, 10 Drawing Sheets

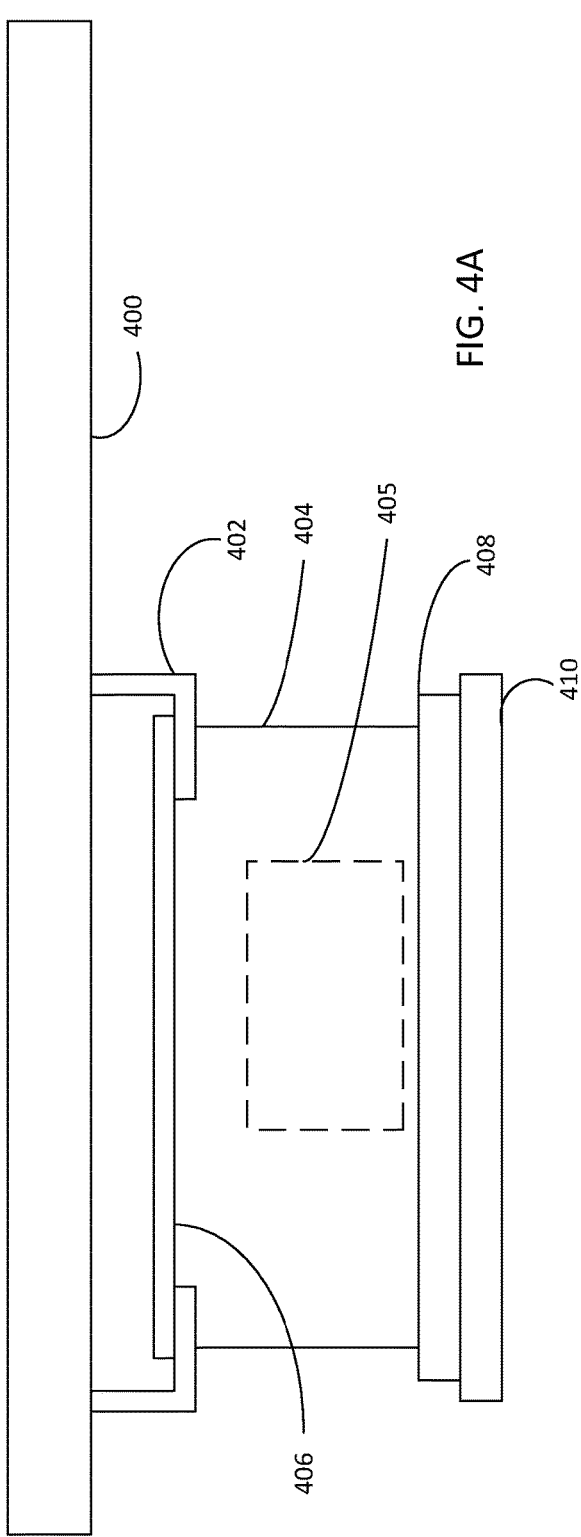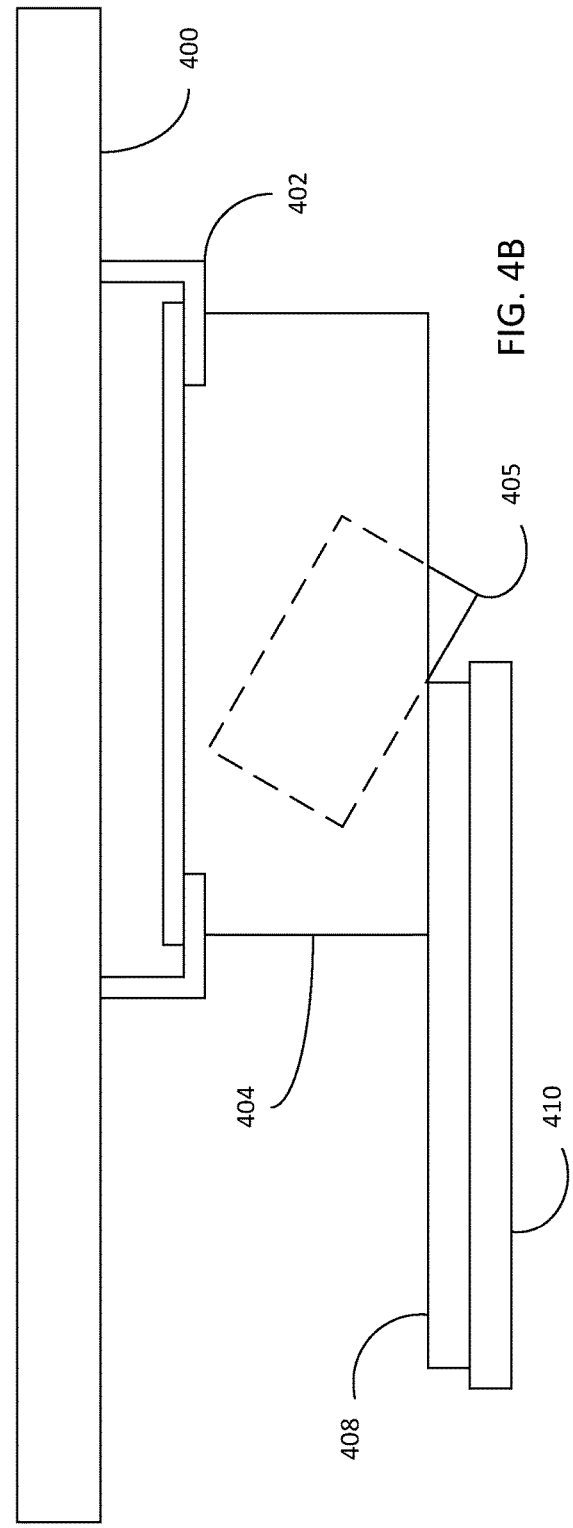

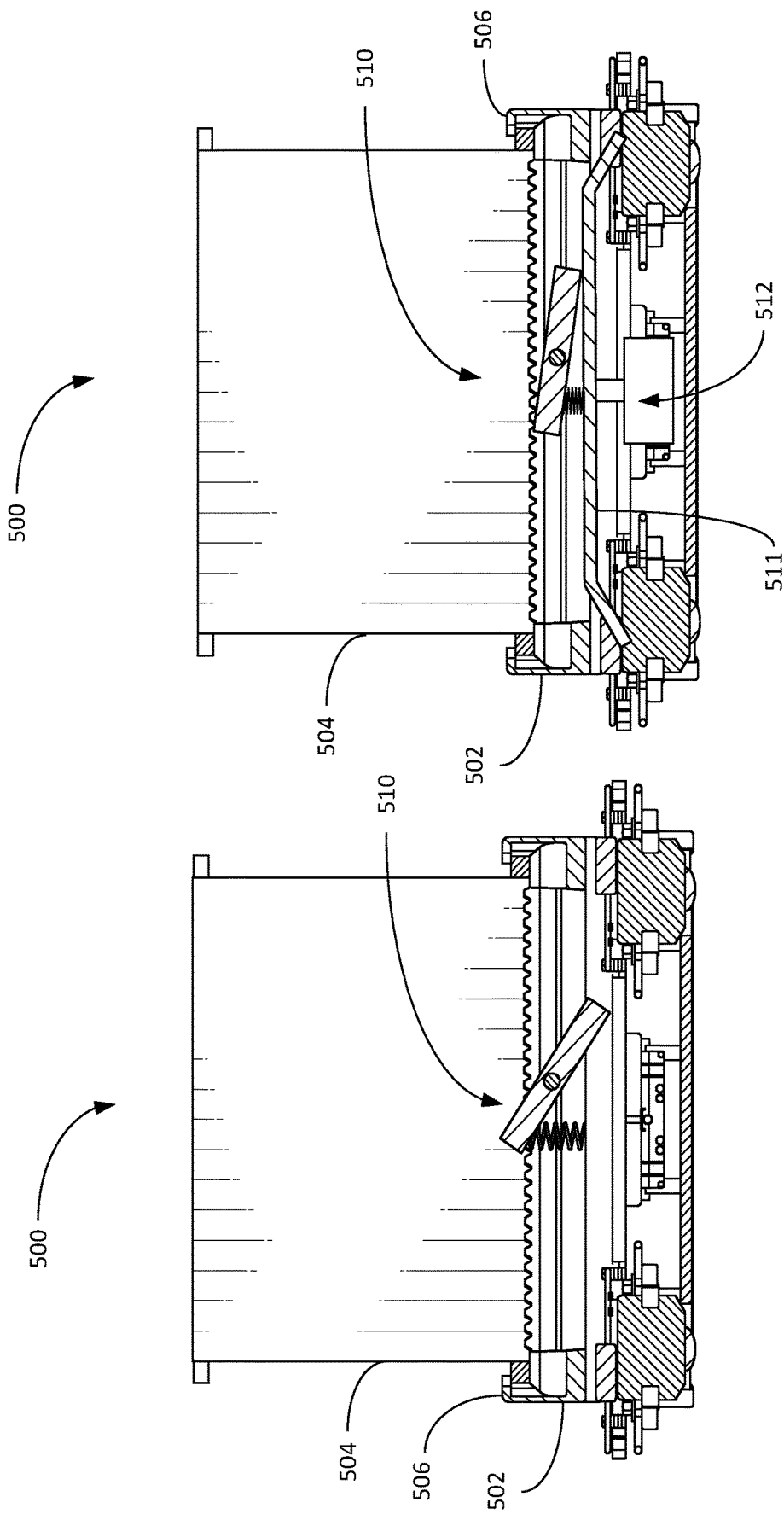

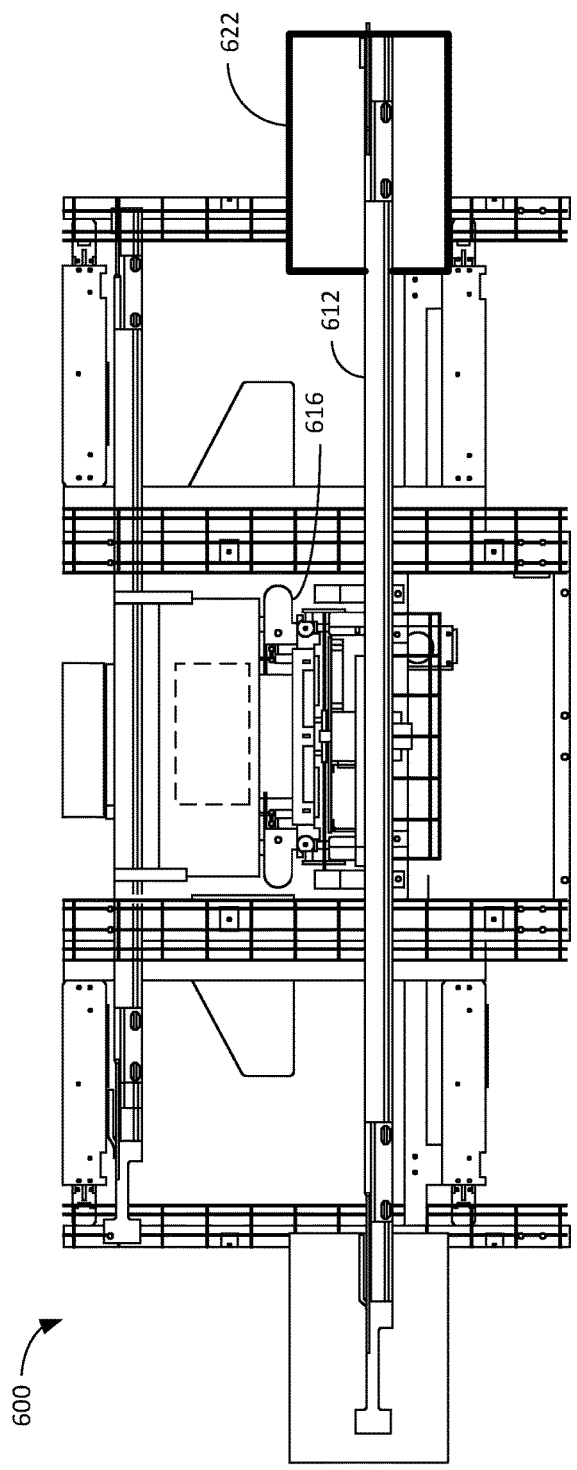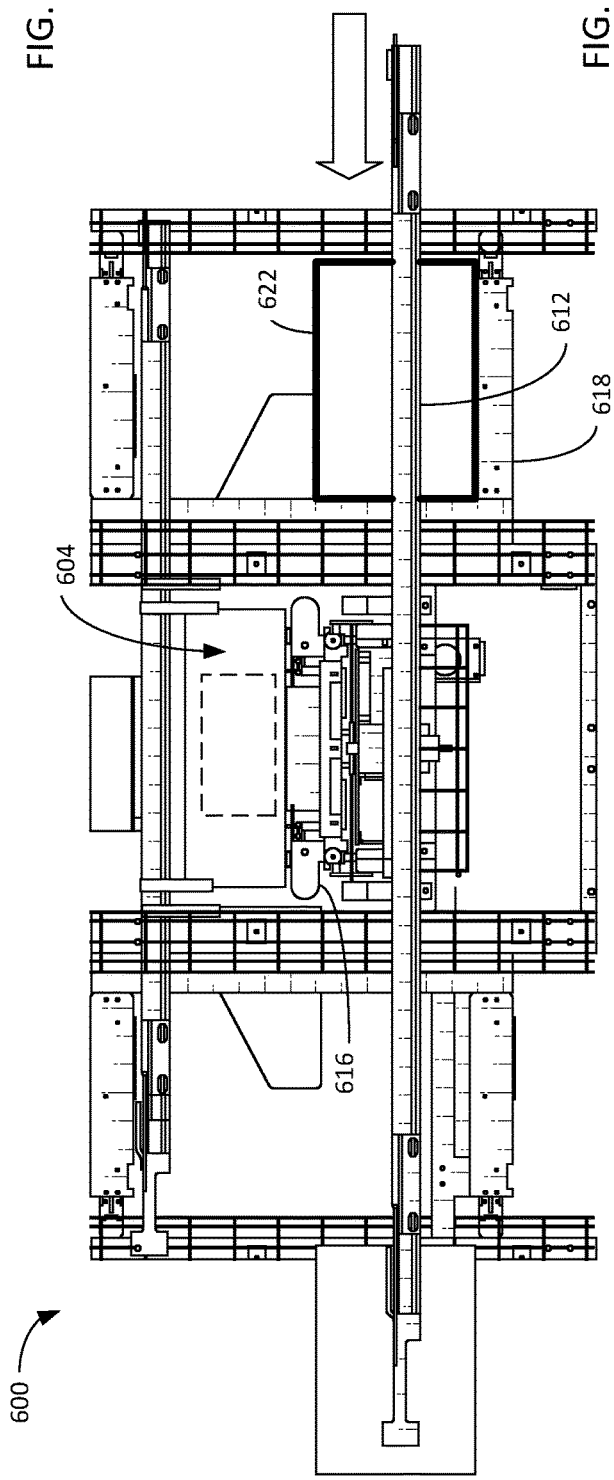

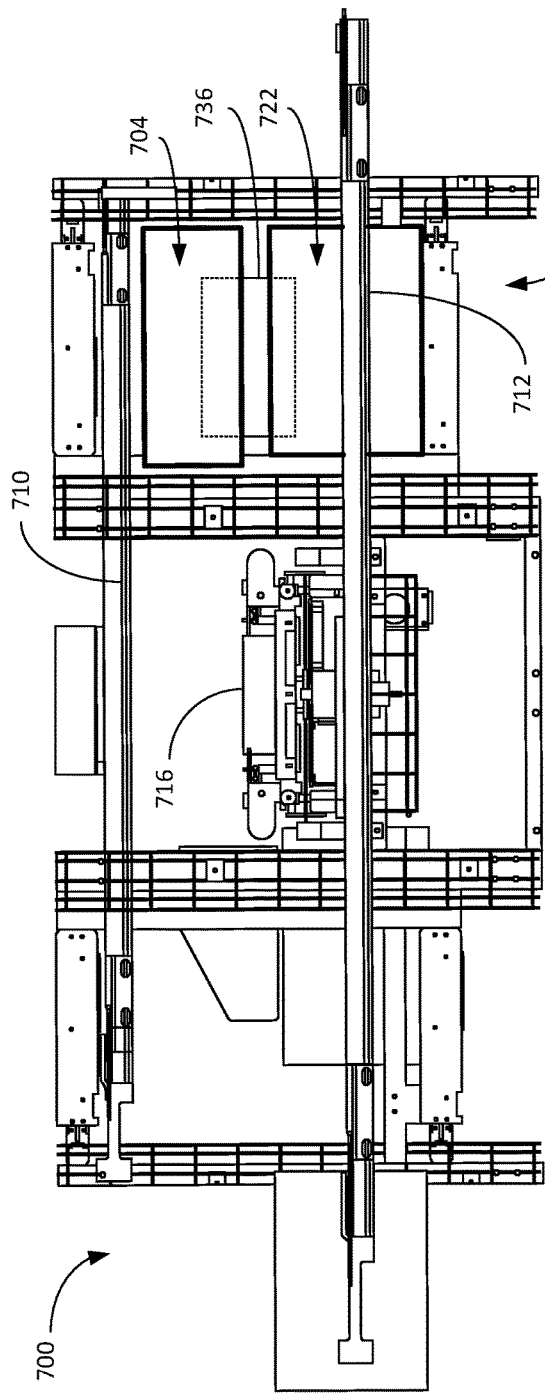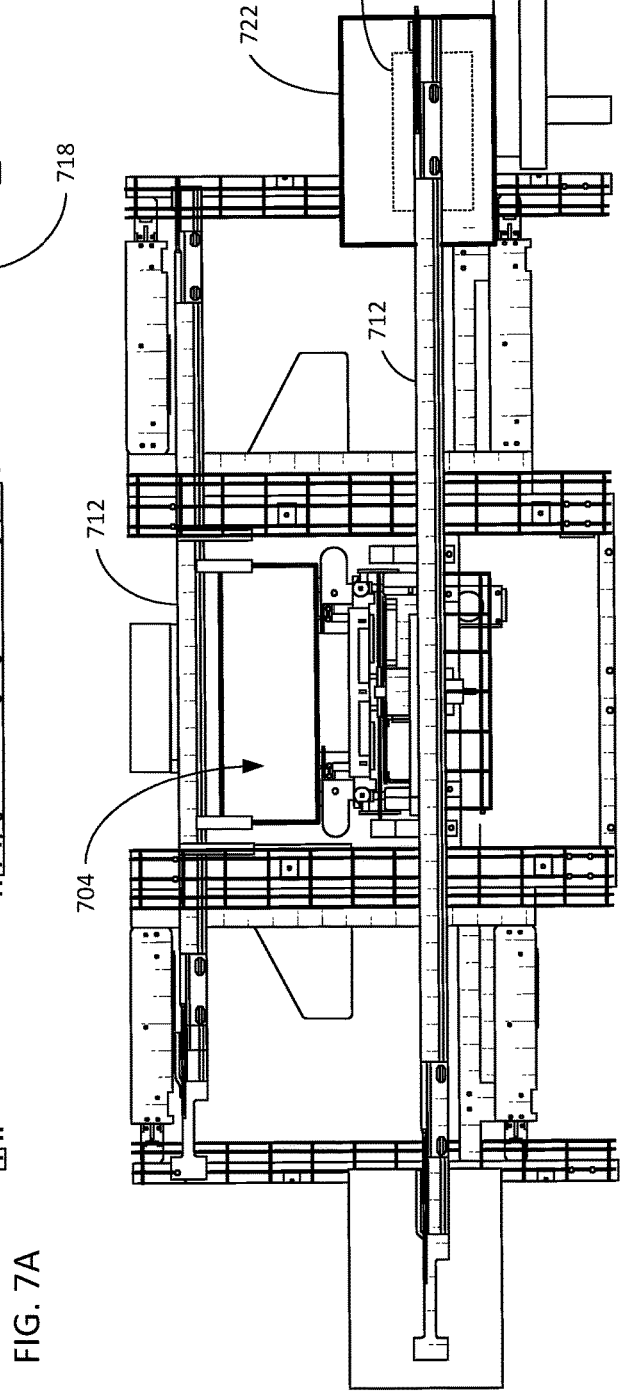
FIG. 7A
FIG. 7B

SYSTEMS AND METHODS FOR UNLOADING SHUTTLES AND LOADING TOTES USING LINEAR ACTUATORS

BACKGROUND

As users increasingly make online purchases, fulfillment of such purchases and other orders become increasingly complicated. For example, a fulfillment center may have output of upwards of one million packages per day. With such demands, efficiency of logistics related to processing orders and distributing packages is of high importance. To achieve efficient distribution and sortation and ultimately fulfillment of such orders, often a various conveyor, roller, chute, and/or shuttle systems are used throughout a fulfillment center to distribute items and/or packages.

Recently, shuttles have been used move items and packages throughout such fulfillment centers. Shuttles typically carry items to various locations throughout the center for sortation. For example, shuttles may carry a single item to a location for sortation. Items from multiple shuttles are often sorted into a single container, such as a tote. However it is challenging and often time consuming to remove an item from a shuttle and deposit the item into the tote. Accordingly, improvements in shuttle based systems for removing items form shuttles and depositing packages into totes may be desired.

BRIEF DESCRIPTION OF THE DRAWINGS

FIGS. 4A-4B are schematic illustrations of the linear actuator moving the item holder, in accordance with one or more example embodiments of the disclosure.

FIGS. 5A-5B are side views of the item shuttle including a lock, in accordance with one or more embodiments of the disclosure.

FIGS. 6A-6B are schematic illustrations of the shuttle sortation system including a lower linear actuator moving a tote, in accordance with one or more embodiments of the disclosure.

FIGS. 7A-7B are schematic illustrations of the shuttle sortation system including an upper linear actuator moving an item holder, in accordance with one or more embodiments of the disclosure.

Figure 1:
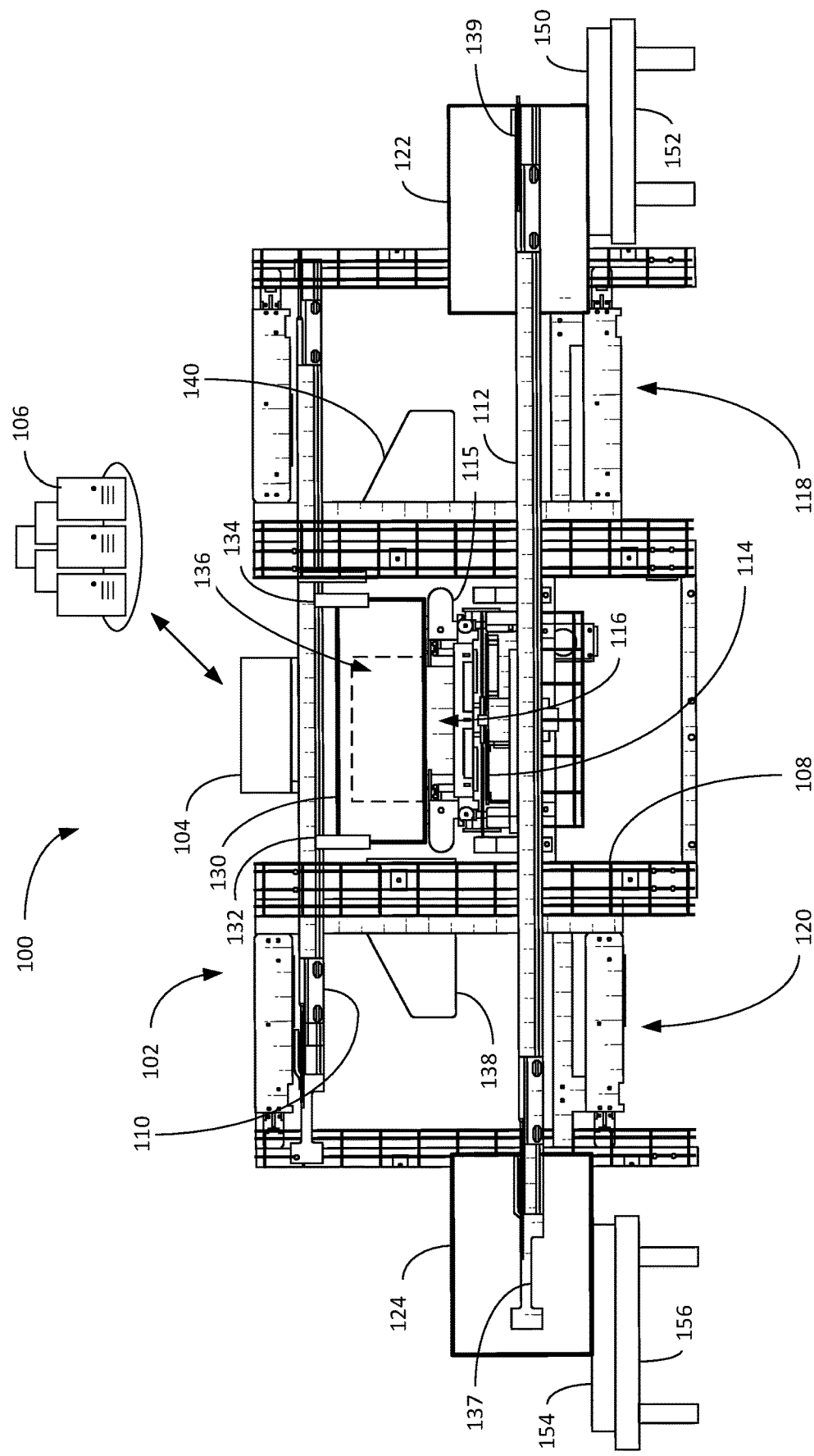
FIG. 1 is a schematic illustration of an a shuttle sortation system with an item track, upper and lower linear actuators, totes and tote tracks, in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. Transportation of products and/or sortation of products (e.g., items) may be time consuming. It is understood that a fulfillment center may alternatively be a sorting center and/or a shipping or delivery center.

To efficiently and safely sort products and/or items in such a facility, a shuttle sortation system is provided herein. The shuttle sortation system may include tracks having linear synchronous motors (LSMs) designed to propel shuttles along the tracks. It is understood that other tracks or propulsion systems may be used. In one example, an item track may be positioned adjacent to tote receiving areas on either side of the item track, each tote receiving area designed to hold or support a tote for receiving multiple items (e.g., packages, products, etc.).

To efficiently unload items from item shuttles and deposit items into totes, linear actuators may be used together with an item shuttle having a tote holder that separates from a base of the item shuttle, which may interface with the track and be propelled along the track. The item holder may have a void on the bottom such that the item may fall through when not supported by the base. The shuttle sortation system may have an upper linear actuator for moving the item holder and thus the item into a tote and lower linear actuator for moving a tote onto a tote shuttle on a tote track.

Referring now to FIG. 1, is a schematic illustration of an a shuttle sortation system with an item track, upper and lower linear actuators, totes, and tote tracks, in accordance with one or more embodiments of the disclosure. As shown in FIG. 1, shuttle sortation system 100 may include support structure 108 which may support upper linear actuator 110 and lower linear actuator 112, which each may be any suitable linear actuators. For example, each linear actuator may include engagement arms or other engagement portions that may move linearly along a track of the linear actuator.

Item track 114 may be secured to support structure 108 or may otherwise extend through or be adjacent to support structure 108. Item track 116 may be a track with a flat low friction surface designed to guide shuttles such as item shuttle 116 throughout a fulfillment facility, for example. Item track 116 may include one or more linear synchronous motors (LSMs) throughout the track for propelling shuttles, such as item shuttles along item track 116. Item shuttles may include a ferrous portion and/or permanent magnet for interacting with the LSMs. Item shuttles may have low friction surfaces and/or wheels for moving along the item track.

Support structure 108 may include controller 104 and may support controller 104 or controller 104 may be positioned elsewhere in shuttle sortation system 100. Controller 104 may be one or more computing devices having a processor and memory and optionally a display. Controller 104, along or together with remote server 106 and/or other controllers, may control upper linear actuator 110, lower linear actuator 112, item track 116, tote tracks 152 and 156 and/or any other actuators or shuttle tracks of shuttle sortation system 100.

Controller 104 may communicate with remote server 106, any shuttle track, any shuttle, and/or the upper and lower linear actuators via any well-known wired or wireless communication system (e.g., Bluetooth, Bluetooth Low Energy (BLE), near field communication protocol, Wi-Fi, cellular network, etc.). Remote server 106 may be one or more servers, computers, desktop computers, laptop computers, datastores, and/or any other electronic or computing device. Controller 104 and/or remote server 106 may control operation of shuttle sortation system 100 and/or perform one or more operations described herein. In one example, controller 104 may control operation of upper linear actuator 110 and lower linear actuator 112 and a different controller may control operation of item track 116, tote track 152, and tote track 156. In yet another example, controller 104 may control operation of upper linear actuator 110, lower linear actuator 112, item track 116, tote track 152, and tote track 156.

Item shuttle 116 may include base 115 which may interface with the item track 114 and may connect to item holder 130. Item holder 130 may be rectangular in shape and together with base 115 may hold and/or constrain one or more items (e.g., item 136). However, it is understood that item holder 130 may be a different shape. Controller 104 and/or remote server 106 may cause item shuttle 116 loaded with item 136 to enter a depositing area of item track 114, adjacent to upper linear actuator 110.

Controller 104 may cause upper linear actuator 110 to move engagement arms 132 and/or 134 to engage item holder 130 of item shuttle 116. Controller may then cause lower linear actuator 112 to move engagement arms 137 and/or 139 to engage a tote (e.g., tote 122 and/or 124) and place the tote into a tote receiving area (e.g., tote receiving area 118 and/or 120). The tote receiving area may be a platform or other structure adjacent to and/or below the depositing area of item track 116 designed to support a tote.

Upper linear actuator 110 may move item holder 130 off of item shuttle 116 and towards a tote receiving area (e.g., tote receiving area 118). Dividers 140 and/or 138 may be positioned between tote receiving areas to help guide items into totes in tote receiving areas. Item holder 130 may slide off of base 115 as upper linear actuator 110 moves toward the tote receiving area. As item holder 130 may not have a bottom portion and instead may have an opening in a bottom region, item 136 may fall through item holder 136 as it is pulled or slid off base 115.

Item 136 may fall into tote 122, for example, as upper linear actuator 110 moves item holder 130 into the tote receiving area. Tote 122 may receive multiple items from multiple item shuttles. Once tote 122 is full or otherwise has received a desired number of items, controller 104 may cause lower linear actuator 112 to move tote to the tote shuttle (e.g., tote shuttle 154 or tote shuttle 150) waiting on a tote track (e.g., tote track 152 or tote track 156).

Tote tracks may be the same as or similar to item tracks. Tote shuttles may be similar to item shuttles but may be designed to transport totes about shuttle sortation system 100. It is understood that a different number of tote tracks and/or item tracks may be included than those shown in FIG. 1. It is further understood that multiple tote receiving areas and/or depositing areas may be positioned along item track 116 and upper and lower linear actuators may be included for each tote receiving area and/or depositing area.

Figure 2:
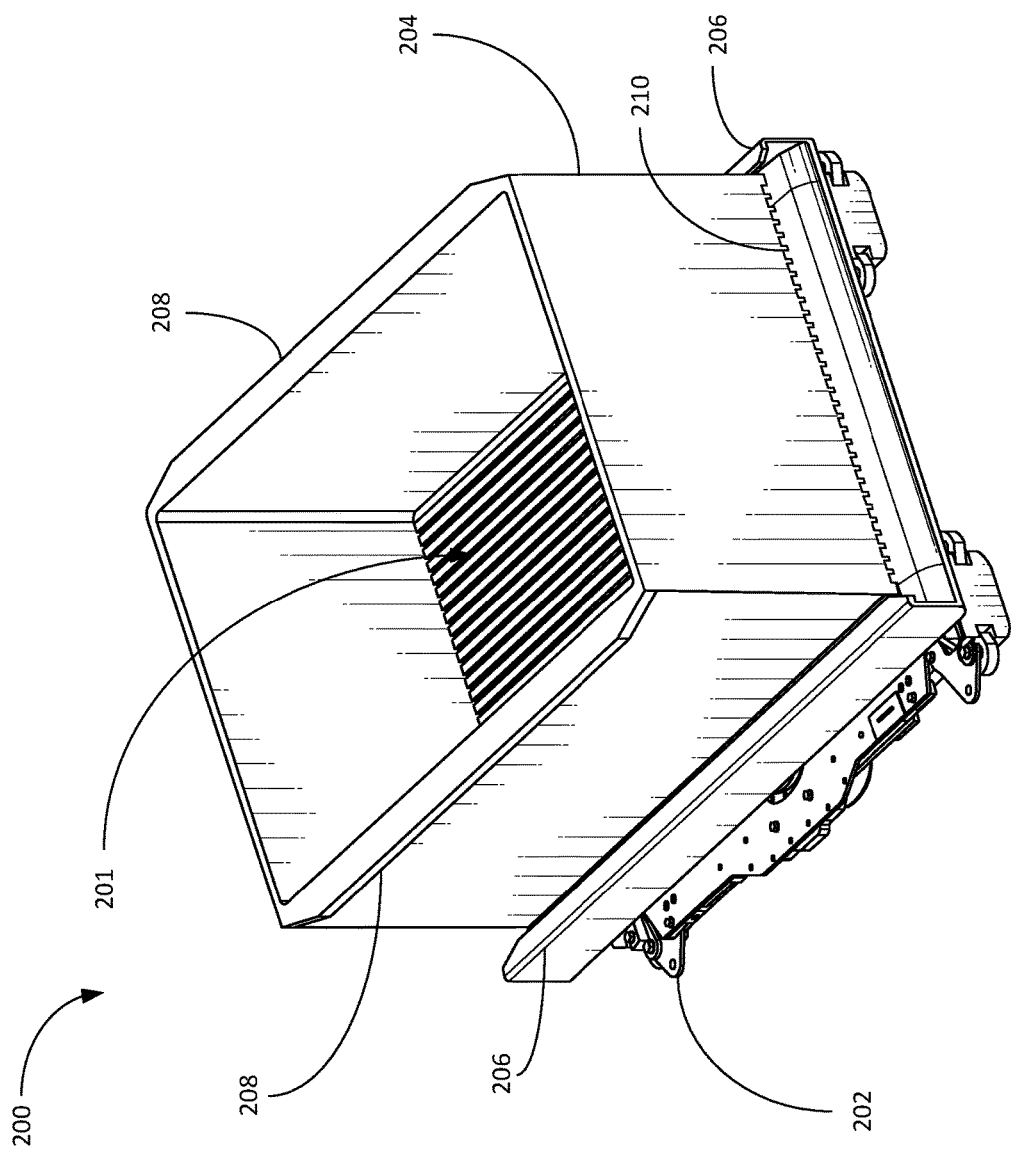
FIG. 2 is a schematic illustration of an item shuttle, in accordance with one or more embodiments of the disclosure.

Referring now to FIG. 2, a schematic illustration of an item shuttle sortation is illustrated, in accordance with one or more embodiments of the disclosure. As shown in FIG. 2, item shuttle 200 may include base 202 and item holder 206. Item shuttle 200 may be the same as or similar to item shuttle 116 of FIG. 1. Item holder 204 may be generally rectangular in shape with four walls and may be open on a top and/or bottom region. Item holder 204 may include upper lips 208 and lower lips which may be protrusions extending along upper and lower edges of item holder 204.

Base 202 may be designed to move along a track surface with low friction and may include one or more ferrous or magnetic portions to interface with the LSMs of the track. Base 202 may have base support 202 for supporting an item in item shuttle 200, which may be grooved. One or more walls of item holder 204 may have grooves 210 which may be received by grooves 201 of base 202. Base 202 may further include lip receivers 206, which may receive the lower lip of item holder 204 and may constrain movement of item holder with respect to base 202 along a first axis and a second axis (e.g., up and down and left and right).

Figure 3:
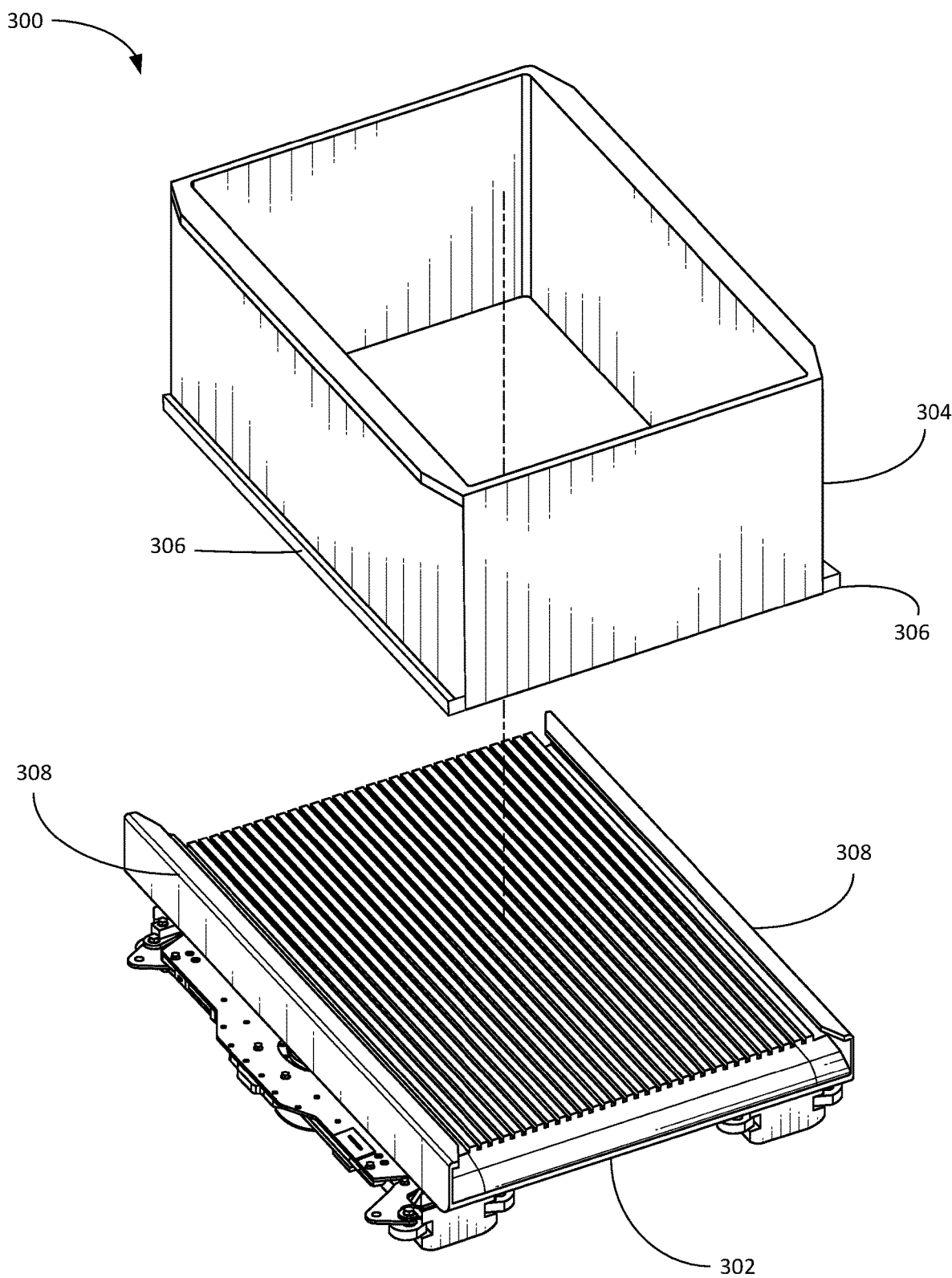
FIG. 3 is a schematic illustration of an item shuttle with a base separated from an item holder, in accordance with one or more embodiments of the disclosure.

Referring now to FIG. 3, a schematic illustration of an item shuttle with the base separated from the item holder is illustrated, in accordance with one or more embodiments of the disclosure. As shown in FIG. 3, item shuttle 300, which may be same as item shuttle 200 of FIG. 2, may include item holder 304 and/or base 302. Item holder 304 may be separated from base, as shown in FIG. 3.

Item holder 304 may include lower lip 306 which may be received by lip receiver 308 of base 302. For example, lower lip 306 may slide into lip receiver 308 such that item holder 304 is free to move along one axis with respect to item shuttle 302, but is constrained from moving in any other direction. The grooves of item shuttle 302 may further restriction movement of item holder 304 to a single axis of freedom.

Referring now to FIGS. 4A-4B, schematic illustrations of the linear actuator moving the item holder is illustrated, in accordance with one or more example embodiments of the disclosure. For example, upper linear actuator 400 may move engagement arms 402 such that engagement arms 402 engage upper lip 406 and to move item holder 404 along an axis parallel to upper linear actuator 400. As shown in FIGS. 4A-4B, upper linear actuator 404 may be moved off of base 408 of an item shuttle at a depositing area of item track 410, thereby permitting item 405 to be released from an underside of item holder 404.

Referring now to FIGS. 5A-5B, side views of the item shuttle including one or more lock are illustrated, in accordance with one or more embodiments of the disclosure. As shown in FIGS. 5A-5B, item shuttle 500 may be the same as or similar to item shuttle 300 of FIG. 3, and may include item holder 504 and base 502. Base 502 may include lip receiver 506, which may constrain item holder 504 such that item holder 504 only has one axis of freedom. Locks 510 may be included on each side of base 502 such that item holder 504 is fully constrained in every direction by locks 510 and lip receivers 506.

Lock 510 may be a rod or block structure that may rotate on its center axis and may be spring loaded to transition from a locked positon, shown in FIG. 5A, to an unlocked positioned shown in FIG. 5B. As shown in FIG. 5B, lock 510 may be caused to transition to an unlocked position by protrusion 511, which may be a rail positioned in the depositing area for example. Protrusion 511 may optionally be actuated by actuator 512 to move up and down. In one example, actuator 512 may generate a signal indicative of the item shuttle in the depositing area. In the unlocked position, item tote 504 may be free to slide on and off base 502. Actuator may also, or alternatively, raise and lower protrusion 511 to selectively engage lock 510.

Referring now to FIGS. 6A-6B, schematic illustrations of the shuttle sortation system including a lower linear actuator moving a tote are illustrated, in accordance with one or more embodiments of the disclosure. For example in FIGS. 6A-6B, shuttle sortation system 600 may be the same as or similar to shuttle sortation system 100 of FIG. 1. As shown in FIG. 6A-6B, when item shuttle 616 is positioned in the depositing area of the item track, lower linear actuator 612 may engage tote 622 (e.g., via engagement arms or any other suitable engagement structure) and move tote 622 into tote receiving area 618. For example tote 622 may be positioned on a tote shuttle that is on a tote track and lower linear actuator 612 may remove tote 622 from the tote shuttle and move the shuttle to the tote receiving area.

Referring now to FIGS. 7A-7B, schematic illustrations of the shuttle sortation system including an upper linear actuator moving an item holder are illustrated, in accordance with one or more embodiments of the disclosure. For example, in FIGS. 7A-7B shuttle sortation system 700 may be the same as or similar to shuttle sortation system 600 of FIG. 6. As shown in FIG. 7A-7B, upper linear actuator 710 may engage item holder 704 of item shuttle 716 and move item holder 704 to a positon over or above tote receiving area 718. Tote 722 may be positioned in tote receiving area 718.

When item holder 704 is moved off the base of item shuttle 16 and positioned over tote 722, item 736 may be released from item holder 704 into tote 722. Once tote 722 receives a desired number of items, lower linear actuator 712 may engage tote 722 (e.g., via engagement arms) if not already engaged, and may move tote 722 to tote shuttle 750 positioned on tote track 752 and may release tote 722 on tote shuttle 750 to load tote 722 onto tote shuttle 750. Tote shuttle 750 may then move along tote track 752 to a different location (e.g., shipping area).

Figure 8:
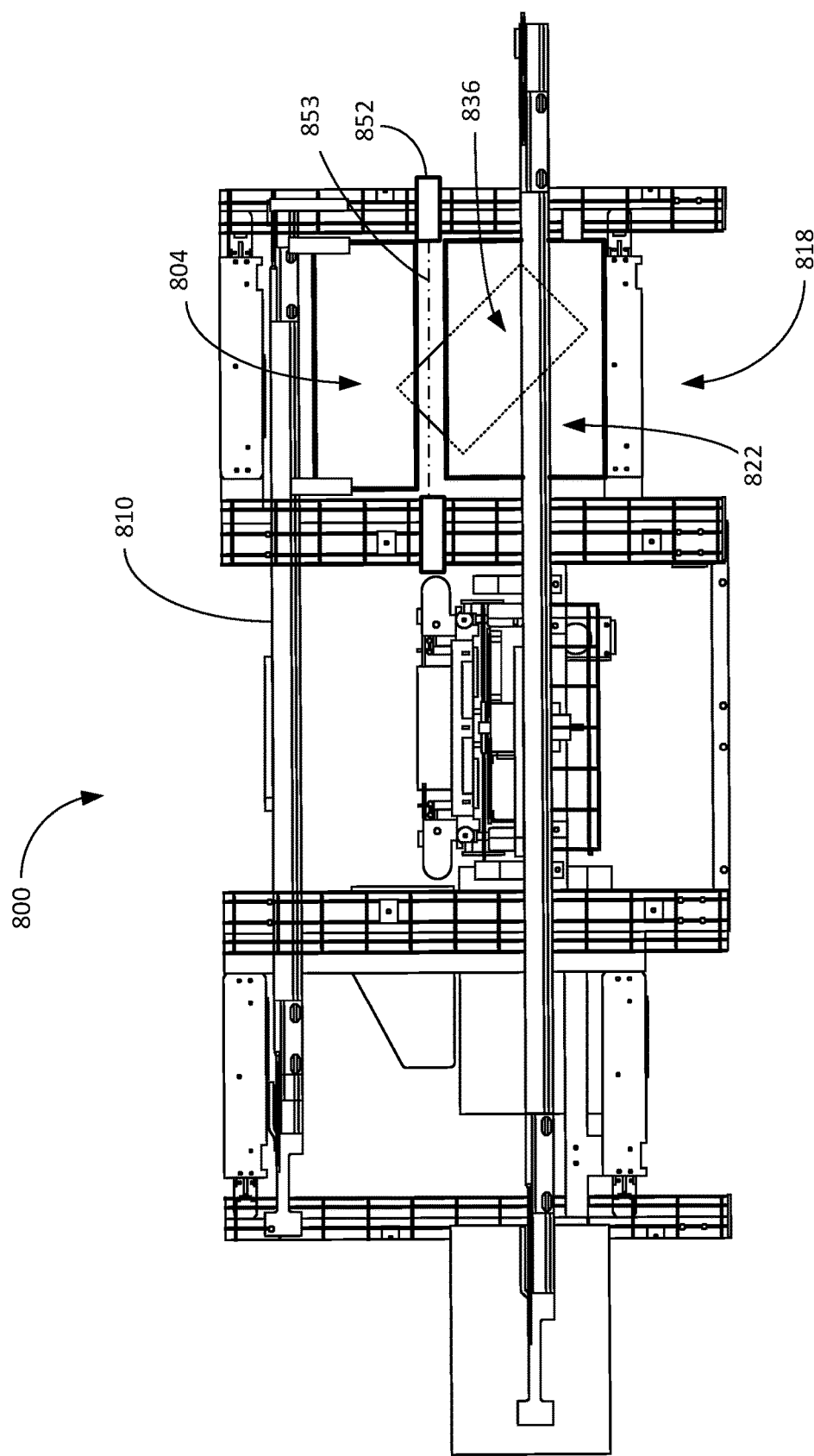
FIG. 8 is a schematic illustration of the shuttle sortation system including a clearance sensor, in accordance with one or more embodiments of the disclosure.

Referring now to FIG. 8, a schematic illustration of the shuttle sortation system including a clearance sensor is illustrated, in accordance with one or more embodiments of the disclosure. For example, in FIG. 8 shuttle sortation system 800 may be the same as or similar to shuttle sortation system 600 of FIG. 6. As shown in FIG. 8, shuttle sortation system 800 may include clearance sensor 852, which may be any well-known optical or other sensor for detecting an obstruction or interference in field of view 853.

When upper linear actuator 810 moves item holder 804 to a position above tote receiving area 818, item 836 is permitted to move out of item holder 804 and into tote 822. However, item 836 may be positioned awkwardly into tote 822 such that part of item 836 extends beyond tote 822 and into item holder 804, which may prevent item holder 804 from returning to the item shuttle. Clearance sensor 852 may be positioned with a field of view between item holder 804 and tote 822 and may generate a signal indicative of such an obstruction. Shuttle sortation system 800 may present an alert when there is an obstruction (e.g., detected interference) and the obstruction may be manually removed.

Figure 9:
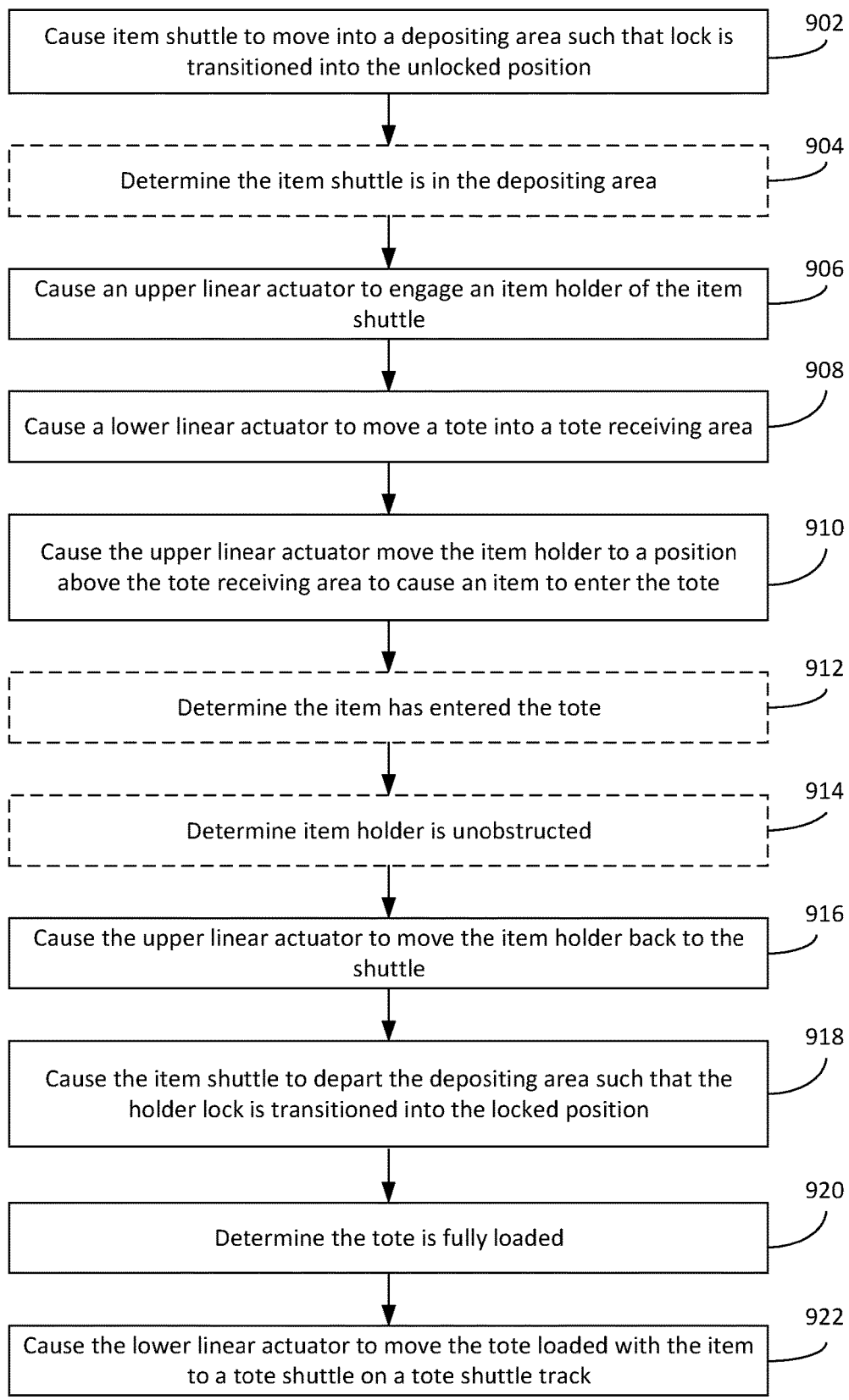
FIG. 9 is an exemplary process flow unloading an item from an item shuttle and depositing the item into a tote, in accordance with one or more embodiments of the disclosure.

Referring now to FIG. 9, example process flow 900 of a shuttle sortation system (e.g., shuttle sortation system 100 of FIG. 1) is depicted for unloading an item from an item shuttle into a tote and loading a tote onto a tote shuttle using linear actuators. It is understood that one or more blocks may be optionally and/or blocks may be performed in a different order. To initiate process flow 900, at block 902 computer-executable instructions stored on a memory of a device, such as a controller and/or remote server, may be executed to cause an item shuttle to move into a depositing area such that one or more locks constraining the item holder of the item shuttle with respect to the base is transitioned into the unlocked position.

At optional block 904 computer-executable instructions stored on a memory of a device, such as a controller, may be executed to determine the item shuttle is in the depositing area. For example, an actuator of a protrusion in the depositing area that interfaces with the lock of the item shuttle may generate a signal that indicates the shuttle is in the depositing area when the protrusion is engaged. At block 906 computer-executable instructions stored on a memory of a device, such as a controller, may be executed to cause an upper linear actuator to engage an item holder of the item shuttle (e.g., engagement arms may receive an upper lip of the item holder).

At block 908, computer-executable instructions stored on a memory of a device, such as a controller, may be executed to cause a lower linear actuator to move the tote into a tote receiving area. At block 910, computer-executable instructions stored on a memory of a device, such as a controller, may be executed to cause the upper linear actuator to move the item holder to a position above the tote receiving area to cause an item to enter the tote. At optional block 912, computer-executable instructions stored on a memory of a device, such as a controller, may be executed to determine the item is loaded into the tote or otherwise entered the tote.

At optional block 914, computer-executable instructions stored on a memory of a device, such as a controller, may be executed to determine the item holder is unobstructed (e.g., using a clearance sensor). At block 916, computer-executable instructions stored on a memory of a device, such as a controller, may be executed to cause the upper linear actuator to move the item holder back to the shuttle in the depositing area. At block 918, computer-executable instructions stored on a memory of a device, such as a controller, may be executed to cause the item shuttle to depart the depositing area, thereby transitioning the lock of the item shuttle to the locked positioned.

At block 920, computer-executable instructions stored on a memory of a device, such as a controller, may be executed to determine the tote is fully loaded (e.g., a desired number of items have been loaded onto the tote). At block 922, computer-executable instructions stored on a memory of a device, such as a controller, may be executed to cause the lower linear actuator move the tote loaded with the item to a tote shuttle on a tote track.

Illustrative Computer Architecture

Figure 10:
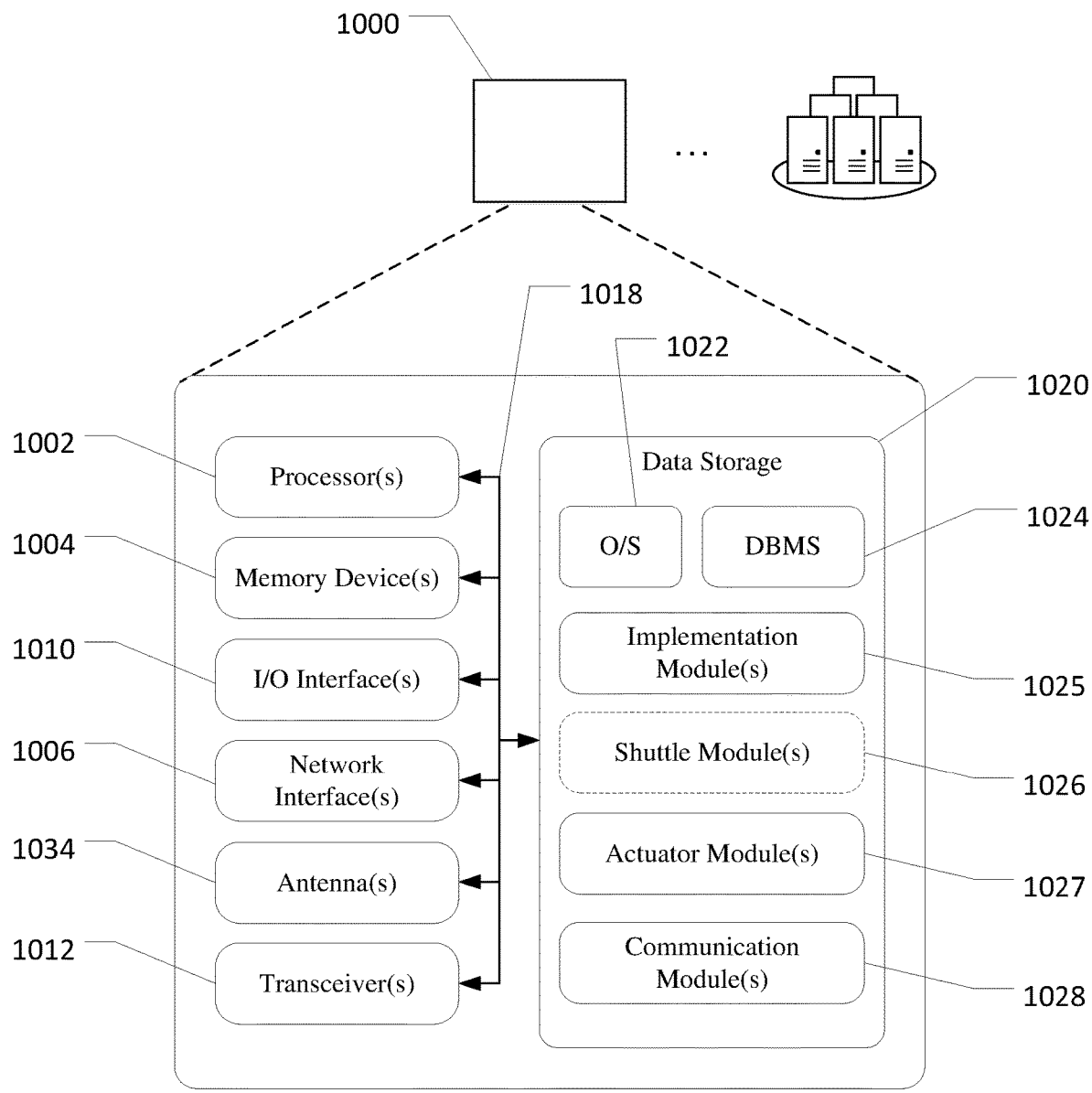
FIG. 10 schematically illustrates an example architecture of a controller of the shuttle sortation system, in accordance with one or more embodiments of the disclosure.

FIG. 10 is a schematic block diagram of an illustrative controller 1000 of the shuttle sortation system for controlling linear actuators for unloading items from shuttles and loading items into totes. Controller 1000 may be the same as or similar to controller 104 of FIG. 1, for example. Controller 1000 may optionally be coupled to and/or communicate with devices including, but not limited to, computing devices, controllers, remote computing devices and/or one or more servers, or the like. It is understood that controller 1000 may instead be a computing device and/or remote computing device or the operations described herein may be performed by both controller 1000 and a remote server (e.g., remote server 106 of FIG. 1).

Controller 1000 may be configured to communicate via one or more networks with one or more servers, computing devices, conveyors, controllers, or the like. Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the controller 1000 may include one or more processors (processor(s)) 1002, one or more memory devices 1004 (generically referred to herein as memory 1004), one or more input/output (I/O) interface(s) 1006, one or more network interface(s) 1008, one or more optional sensors or sensor interface(s), one or more transceivers 1012, one or more optional speakers, one or more optional microphones, and one or more antenna(s) 1034. The controller 1000 may further include one or more buses 1018 that functionally couple various components of the controller 1000. The controller 1000 may further include one or more antenna(e) 1034 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals including BLE signals, a Near Field Communication (NFC) antenna for transmitting or receiving NFC signals, a 900 MHz antenna, and so forth. These various components will be described in more detail hereinafter.

The bus(es) 1018 may include at least one of a system bus, a memory bus, an address bus, or a message bus, and may permit exchange of information (e.g., data (including computer-executable code), signaling, etc.) between various components of the controller 1000. The bus(es) 1018 may include, without limitation, a memory bus or a memory controller, a peripheral bus, an accelerated graphics port, and so forth. The bus(es) 1018 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 1004 of the computing device may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1004 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1004 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1020 may include removable storage and/or non-removable storage including, but not limited to, magnetic storage, optical disk storage, and/or tape storage. The data storage 1020 may provide non-volatile storage of computer-executable instructions and other data. The memory 1004 and the data storage 1020, removable and/or non-removable, are examples of computer-readable storage media (CRSM) as that term is used herein.

The data storage 1020 may store computer-executable code, instructions, or the like that may be loadable into the memory 1004 and executable by the processor(s) 1002 to cause the processor(s) 1002 to perform or initiate various operations. The data storage 1020 may additionally store data that may be copied to memory 1004 for use by the processor(s) 1002 during the execution of the computer-executable instructions. Moreover, output data generated as a result of execution of the computer-executable instructions by the processor(s) 1002 may be stored initially in memory 1004, and may ultimately be copied to data storage 1020 for non-volatile storage.

More specifically, the data storage 1020 may store one or more operating systems (O/S) 1022; one or more optional database management systems (DBMS) 1024; and one or more implementation module(s) 1025, one or more optional shuttle module(s) 1026, one or more actuator module(s) 1027, and/or one or more communication module(s) 1028. Some or all of these module(s) may be sub-module(s). Any of the components depicted as being stored in data storage 1020 may include any combination of software, firmware, and/or hardware. The software and/or firmware may include computer-executable code, instructions, or the like that may be loaded into the memory 1004 for execution by one or more of the processor(s) 1002. Any of the components depicted as being stored in data storage 1020 may support functionality described in reference to correspondingly named components earlier in this disclosure.

The data storage 1020 may further store various types of data utilized by components of the controller 1000. Any data stored in the data storage 1020 may be loaded into the memory 1004 for use by the processor(s) 1002 in executing computer-executable code. In addition, any data depicted as being stored in the data storage 1020 may potentially be stored in one or more datastore(s) and may be accessed via the DBMS 1024 and loaded in the memory 1004 for use by the processor(s) 1002 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 10, the datastore(s) may include, for example, user preference information, user contact data, device pairing information, and other information.

The processor(s) 1002 may be configured to access the memory 1004 and execute computer-executable instructions loaded therein. For example, the processor(s) 1002 may be configured to execute computer-executable instructions of the various program module(s), applications, engines, or the like of the controller 1000 to cause or facilitate various operations to be performed in accordance with one or more embodiments of the disclosure. The processor(s) 1002 may include any suitable processing unit capable of accepting data as input, processing the input data in accordance with stored computer-executable instructions, and generating output data. The processor(s) 1002 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), an application-specific integrated circuit, a digital signal processor (DSP), and so forth. Further, the processor(s) 1002 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1002 may be capable of supporting any of a variety of instruction sets.

Referring now to functionality supported by the various program module(s) depicted in FIG. 10, the implementation module(s) 1025 may include computer-executable instructions, code, or the like that responsive to execution by one or more of the processor(s) 1002 may perform functions including, but not limited to, overseeing coordination and interaction between one or more modules and computer executable instructions in data storage 1020, determining actions and tasks from a remote computing device or controller, determining actions associated with user interactions, determining actions associated with user input, sending and receiving signals and/or data to and from one or more sensors, switches, electromagnets, LSMs, controllers, other computing devices, servers, datastores and the like, initiating commands locally or at remote computing devices and/or controllers, and the like.

Shuttle module 1026 may be optional and may include computer-executable instructions, code, or the like that responsive to execution by one or more of the processor(s) 1002 may perform functions including, but not limited to determining coordinates or a destination for a shuttle and/or a payload and determining a shuttle location with respect to a shuttle sortation system. It is understood that controller 1000 may not include shuttle module 1026 and instead a different controller may control operation of item and tote tracks for moving tote and item shuttles.

Actuator module 1027 may include computer-executable instructions, code, or the like that responsive to execution by one or more of the processor(s) 1002 may perform functions including, but not limited to controlling one or more upper linear actuators or lower linear actuators for moving an item holder and/or moving a tote to a tote shuttle on a tote track.

The communication module(s) 1028 may include computer-executable instructions, code, or the like that responsive to execution by one or more of the processor(s) 1002 may perform functions including, but not limited to, communicating with one or more sensors, controllers, conveyor belts, conveyor systems, for example, via wired or wireless communication, communicating with electronic devices, communicating with one or more computing devices, servers (e.g., remote servers), communicating with remote datastores and/or databases, sending or receiving notifications or commands/directives, communicating with cache memory data, and the like.

Referring now to other illustrative components depicted as being stored in the data storage 1020, the O/S 1022 may be loaded from the data storage 1020 into the memory 1004 and may provide an interface between other application software executing on the controller 1000 and hardware resources of the controller 1000. More specifically, the O/S 1022 may include a set of computer-executable instructions for managing hardware resources of the computing device 1000 and for providing common services to other application programs (e.g., managing memory allocation among various application programs). In certain example embodiments, the O/S 1022 may control execution of the other program module(s) to for content rendering. The O/S 1022 may include any operating system now known or which may be developed in the future including, but not limited to, any server operating system, any mainframe operating system, or any other proprietary or non-proprietary operating system.

The optional DBMS 1024 may be loaded into the memory 1004 and may support functionality for accessing, retrieving, storing, and/or manipulating data stored in the memory 1004 and/or data stored in the data storage 1020. The DBMS 1024 may use any of a variety of database models (e.g., relational model, object model, etc.) and may support any of a variety of query languages. The DBMS 1024 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. As the controller 1000 is a mobile electronic device, the DBMS 1024 may be any suitable light-weight DBMS optimized for performance on a mobile device.

Referring now to other illustrative components of the controller 1000, the optional input/output (I/O) interface(s) 1006 may facilitate the receipt of input information by the controller 1000 from one or more I/O devices as well as the output of information from the controller 1000 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the controller 1000 or may be separate. The I/O devices may further include, for example, any number of peripheral devices such as data storage devices, printing devices, and so forth.

The I/O interface(s) 1006 may also include an interface for an external peripheral device connection such as universal serial bus (USB), FireWire, Thunderbolt, Ethernet port or other connection protocol that may connect to one or more networks. The I/O interface(s) 1006 may also include a connection to one or more of the antenna(e) 1034 to connect to one or more networks via a wireless local area network (WLAN) (such as Wi-Fi®) radio, Bluetooth, ZigBee, and/or a wireless network radio, such as a radio capable of communication with a wireless communication network such as a Long Term Evolution (LTE) network, WiMAX network, 3G network, ZigBee network, etc.

The controller 1000 may further include one or more network interface(s) 1008 via which the controller 1000 may communicate with any of a variety of other systems, platforms, networks, devices, and so forth. The network interface(s) 1008 may enable communication, for example, with one or more wireless routers, one or more host servers, one or more web servers, and the like via one or more of networks.

The antenna(e) 1034 may include any suitable type of antenna depending, for example, on the communications protocols used to transmit or receive signals via the antenna (e) 1034. Non-limiting examples of suitable antennas may include directional antennas, non-directional antennas, dipole antennas, folded dipole antennas, patch antennas, multiple-input multiple-output (MIMO) antennas, or the like. The antenna(e) 1034 may be communicatively coupled to one or more transceivers 1012 or radio components to which or from which signals may be transmitted or received.

As previously described, the antenna(e) 1034 may include a Bluetooth antenna configured to transmit or receive signals in accordance with established standards and protocols, such as Bluetooth and/or BLE. Alternatively, or in addition to, antenna(e) 1034 may include cellular antenna configured to transmit or receive signals in accordance with established standards and protocols, such as or cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like. The antenna(e) 1034 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 1034 may be configured to transmit or receive radio frequency signals within any suitable frequency range forming part of the unlicensed portion of the radio spectrum (e.g., 900 MHz).

The antenna(e) 1034 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1012 may include any suitable radio component(s) for—in cooperation with the antenna(e) 1034—transmitting or receiving radio frequency (RF) signals in the bandwidth and/or channels corresponding to the communications protocols utilized by the controller 1000 to communicate with other devices. The transceiver(s) 1012 may include hardware, software, and/or firmware for modulating, transmitting, or receiving—potentially in cooperation with any of antenna(e) 1034—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1012 may further include hardware, firmware, or software for receiving GNSS signals. The transceiver(s) 1012 may include any known receiver and baseband suitable for communicating via the communications protocols utilized by the controller 1000. The transceiver(s) 1012 may further include a low noise amplifier (LNA), additional signal amplifiers, an analog-to-digital (A/D) converter, one or more buffers, a digital baseband, or the like.

The optional sensor(s)/sensor interface(s) 1010 may include or may be capable of interfacing with any suitable type of sensing device such as, for example, inertial sensors (e.g., motion sensor(s)), force sensors, thermal sensors, and so forth. Example types of inertial sensors may include accelerometers (e.g., MEMS-based accelerometers), gyroscopes, and so forth. Sensor(s)/sensor interface(s) 1010 may additionally, or alternatively, include health related sensors such as electrocardiogram (ECG) sensors, glucose sensors, heartrate sensors, temperature sensors, and the like. The optional speaker(s) may be any device configured to generate audible sound. The optional microphone(s) may be any device configured to receive analog sound input or voice data, and may include noise cancellation functionality.

It should be appreciated that the program module(s), applications, computer-executable instructions, code, or the like depicted in FIG. 10 as being stored in the data storage 1020 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the controller 1000 and/or hosted on other computing device(s) accessible via one or more networks, may be provided to support functionality provided by the program module(s), applications, or computer-executable code depicted in FIG. 10 and/or additional or alternate functionality. Further, functionality may be modularized differently such that processing described as being supported collectively by the collection of program module(s) depicted in FIG. 10 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 10 may be implemented, at least partially, in hardware and/or firmware across any number of devices.

It should further be appreciated that the controller 1000 may include alternate and/or additional hardware, software, or firmware components beyond those described or depicted without departing from the scope of the disclosure. More particularly, it should be appreciated that software, firmware, or hardware components depicted as forming part of the controller 1000 are merely illustrative and that some components may not be present or additional components may be provided in various embodiments. While various illustrative program module(s) have been depicted and described as software module(s) stored in data storage 1020 it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more exemplary embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A system comprising:
    an item track configured to propel an item shuttle along the item track, the shuttle having a base, an item holder configured to constrain an item and having a void in a bottom portion, and a lock configured to restrict movement of the item holder with respect to the base in a first direction;
    an item loading structure configured to receive the item track and having a depositing area with a protrusion, the protrusion configured to transition the lock to an unlocked positioned when the item shuttle is in the depositing area such that the item holder is permitted to move with respect to the base in the first direction;
    a tote receiving area configured to support a tote, the tote receiving area adjacent to and below the depositing area;
    an upper linear actuator coupled to the item loading structure, the upper linear actuator configured to selectively engage the item holder to move the item holder from the depositing area to a position above the tote receiving area;
    a lower linear actuator configured selectively engage a tote and move the tote between the tote receiving area and a tote loading area of an tote track, the tote track configured to propel a tote shuttle along the tote track, the tote shuttle configured to hold a tote;
    memory configured to store computer-executable instructions; and
    at least one computer processor configured to access memory and execute the computer-executable instructions to:
        determine the item shuttle is in the depositing area;
        cause the lower linear actuator to move the tote into the tote receiving area;
        cause the upper linear actuator move the item holder to the position above tote receiving area;
        cause the upper linear actuator to move the item holder onto the item shuttle in the depositing area; and
        cause the lower linear actuator to move the tote onto the tote shuttle on the tote track.

2. The system of claim 1, wherein causing the upper linear actuator to move the item holder into the position above the tote receiving area causes the item in the item holder to enter the tote in the tote receiving area.

3. The system of claim 1, wherein the item holder has an upper lip and the upper linear actuator is configured to engage the upper lip to cause the item holder to move to the position above tote receiving area.

4. The system of claim 1, further comprising a clearance sensor configured to generate a signal indicative of an interference with the item holder.

5. A system comprising:
    an item track configured to guide an item shuttle along the item track, the item shuttle having a base and an item holder configured constrain an item, the item track having a depositing area configured to release the item holder from the base;
    an upper linear actuator configured to engage the item holder to move the item holder from the depositing area to a position above a tote receiving area adjacent to the depositing area;
    a lower linear actuator configured to engage a tote and move the tote between the tote receiving area and a tote loading area of a tote track configured to guide a tote shuttle;
    memory configured to store computer-executable instructions; and
    at least one computer processor configured to access memory and execute the computer-executable instructions to:
        cause the upper linear actuator to move the item holder released from the base to the position above the tote receiving area to deposit the item into the tote;
        cause the lower linear actuator to move the tote with the item onto the tote shuttle on the tote track; and
        cause the upper linear actuator to move the item holder onto the item shuttle.

6. The system of claim 5, wherein the depositing area has a protrusion and the protrusion is configured to transition a lock constraining the item holder in one direction with respect to the base from a locked position to an unlocked position when the item shuttle is positioned on the depositing area.

7. The system of claim 5, wherein the item holder has an upper lip and a void at a bottom portion of the item holder and the upper linear actuator is configured to engage the upper lip to cause the item holder to move to the tote receiving area.

8. The system of claim 7, wherein the item holder has a lower lip and the base engages the lower lip to restrict movement of the item holder with respect to the base along a first axis and a second axis.

9. The system of claim 8, wherein the item shuttle has a lock configured restrict movement of the item holder with respect to the base along a third axis different than the first axis and third axis.

10. The system of claim 5, wherein the item track is positioned between the tote receiving area and a second tote receiving area, the second tote receiving area configured to receive a second tote.

11. The system of claim 5, wherein the tote receiving area is positioned at a first height below a second height of the item track.

12. The system of claim 5, further comprising a clearance sensor configured to generate a a signal indicative of an interference with the upper linear actuator.

13. The system of claim 5, wherein the item track has linear synchronous motors and the item shuttle includes a ferrous portion configured to interact with the linear synchronous motors to propel the item shuttle along the item track.

14. A method comprising:
    determining, by a controller, an item shuttle is in the depositing area of an item track, the item shuttle having a base and an item holder configured to constrain an item, the base of the item shuttle adapted to release the item holder from the base when the item shuttle is positioned in the depositing area;

causing an upper linear actuator to engage the item holder of the item shuttle, causing a lower linear actuator to move a tote into a tote receiving area adjacent to the depositing area, the lower linear actuator positioned below the upper linear actuator;

causing the upper linear actuator to move the item holder to a position above the tote receiving area, thereby releasing the item into the tote; and causing the upper linear actuator to move the item holder onto the base of the item shuttle.

15. The method of claim 14, further comprising causing the lower linear actuator to move the tote loaded with the item onto a tote shuttle positioned on a tote track.

16. The method of claim 14, wherein the item holder has an upper lip extending along an upper edge of the item holder and a lower lip extending along a lower edge of the item holder and has a void at a bottom portion of the item holder.

17. The method of claim 16, wherein the upper linear actuator receives the upper lip of the item holder.

18. The method of claim 16, wherein the base of the item shuttle has a lip receiver for receiving the lower lip of the item holder and the lip receiver is configured to constrain movement of the item holder along a first axis and a second axis.

19. The method of claim 14, wherein the base has a lock adapted to constrain the item holder with respect to the base along a first axis and the depositing area of an item track has a protrusion adapted to transition the lock from a locked position to an unlocked position when the item shuttle is positioned in the depositing area of the item track.

20. The method of claim 14, wherein the item track has linear synchronous motors and the item shuttle includes a ferrous portion configured to interact with the linear synchronous motors.

* * * * *